Sept. 2, 1924.

E. SCHUSTER

CALCULATING MACHINE

Filed May 20, 1924     5 Sheets-Sheet 3

1,507,253

Inventor
E. Schuster
by William C. Linton
Attorney

Inventor
E. Schuster
by William C. Linton
Attorney

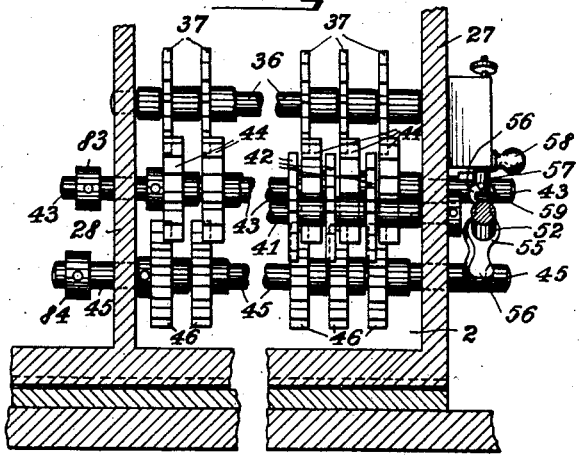
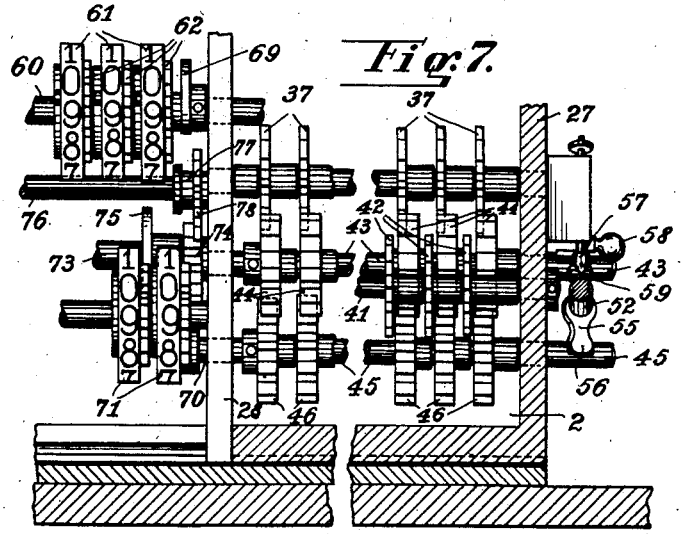
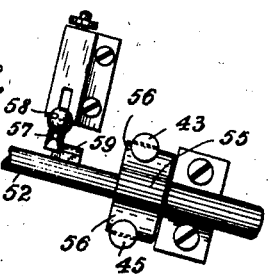

Patented Sept. 2, 1924.

1,507,253

UNITED STATES PATENT OFFICE.

ERNST SCHUSTER, OF BERLIN, GERMANY.

CALCULATING MACHINE.

Application filed May 20, 1924. Serial No. 714,729.

*To all whom it may concern:*

Be it known that I, ERNST SCHUSTER, a citizen of the German Republic, and resident of Berlin, Germany, have invented certain new and useful Improvements in Calculating Machines, of which the following is a specification.

My invention relates to a calculating machine having driving-wheels, the number of the teeth of which is adjustable, as well as two counting mechanisms which are completely independent from one another and are driven by an adjusting mechanism which is common to them both.

The gist of the invention resides therein that one of the two counting mechanisms which is driven by the indicating mechanism independent of the other counting mechanism is actuated by the intermediary of a reversing gear, the reversal of which is effected by the rotation of a guide-member in such a manner that the axles of the intermediate wheels are shifted in opposite directions, in order to reverse the direction of revolution of the second counting mechanism.

It is rendered possible in this way, and in the simplest manner, to actuate the second counting mechanism in the same direction as the first counting mechanism, or counter thereto, so that it is rendered possible to perform composite or compounded calculations of any kind.

Figure 1:
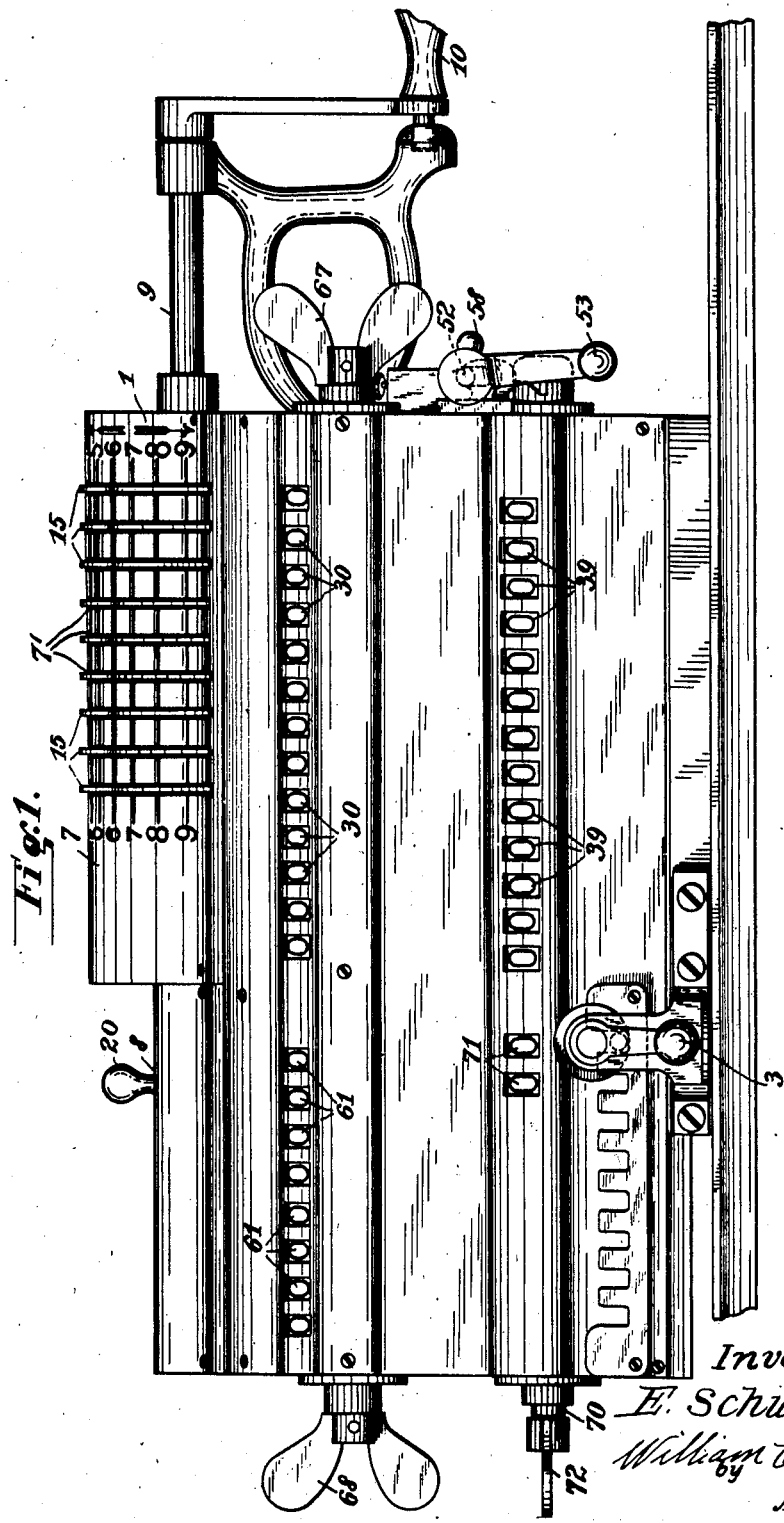
Figure 2:
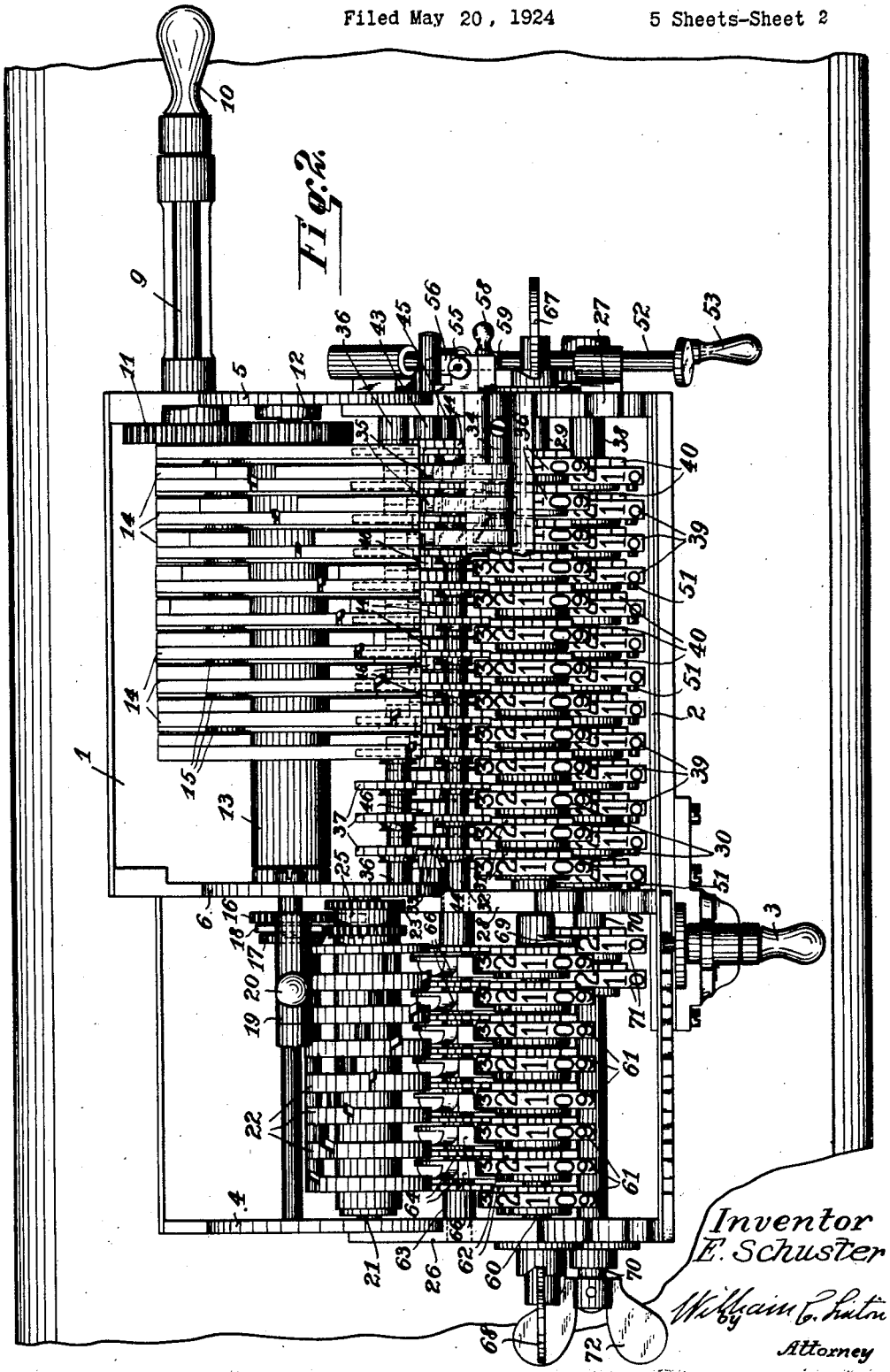
Figure 3:
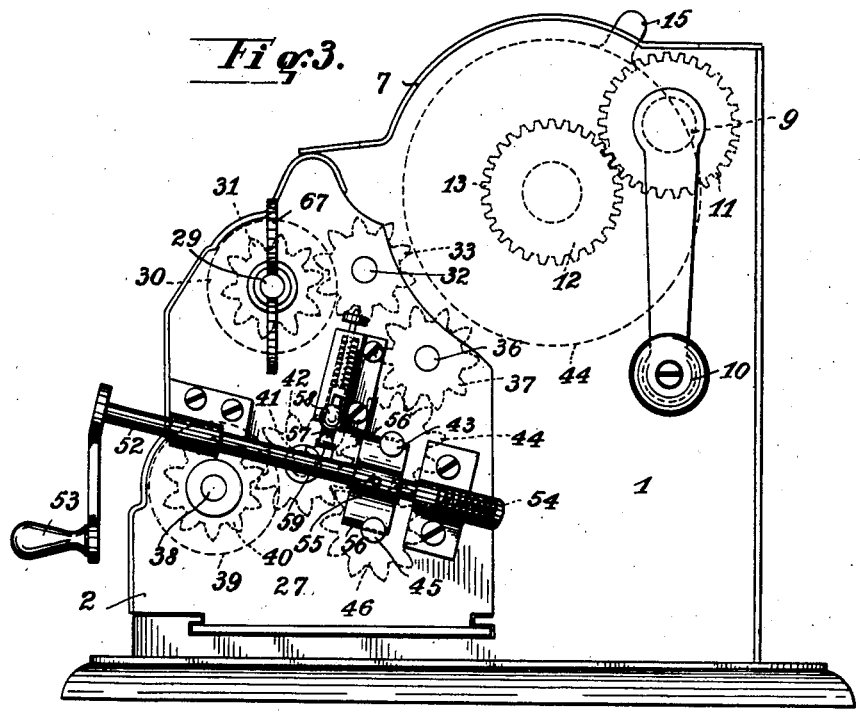
Figure 5:
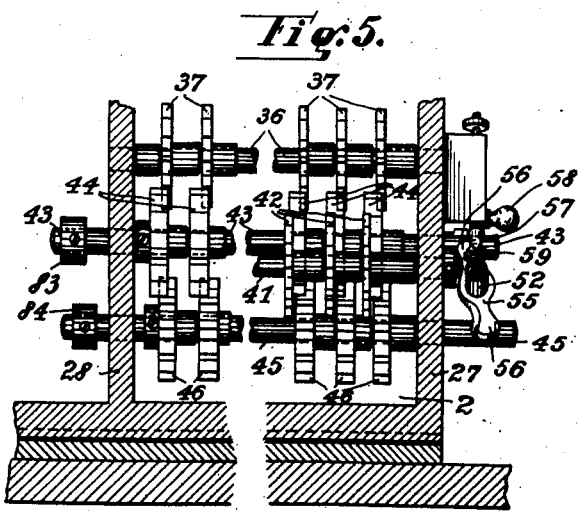
Figure 4:
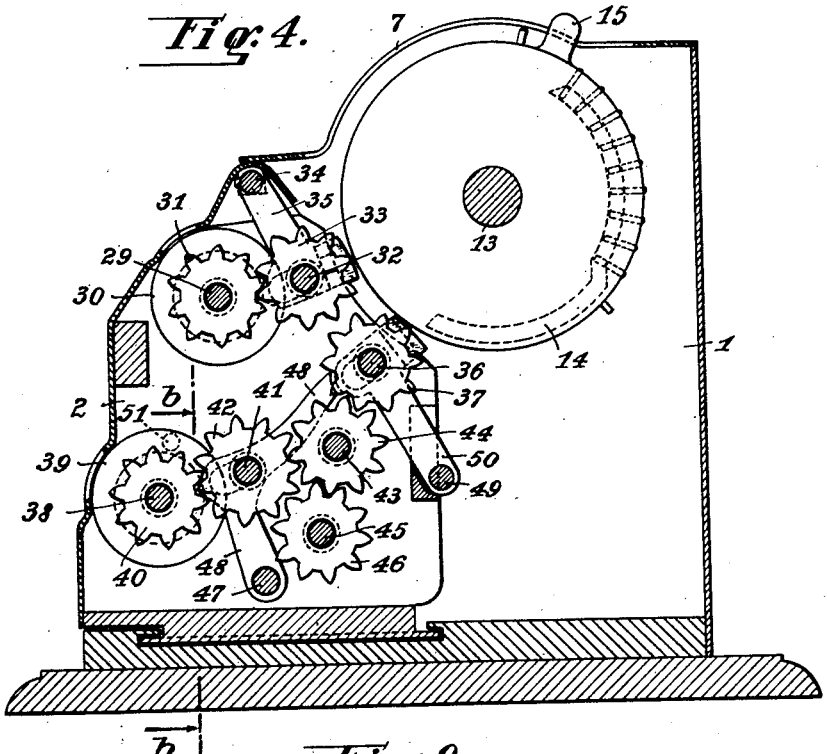
Figure 9:
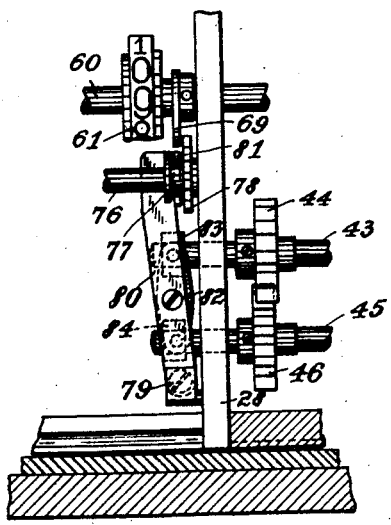

My invention is illustrated by way of example in the accompanying drawings in which Figure 1 is a front-view of the improved calculating machine; Figure 2 is a plan, the casing being removed; Figure 3 is a side-view of the machine, seen from the righthand side; Figure 4 is a vertical cross-section through the righthand part of the machine which contains the indicating mechanisms; Figures 5 and 6 show each a section in the plane b—b of Fig. 4, the cog-wheels being shown in their position for positive calculation (Fig. 5), as well as for negative calculation (Fig. 6); Figure 7 shows the same parts or wheels, in connection with parts of one of the two counting mechanisms, the other one being disengaged; and Figures 8 and 9 show details which are duly described hereinafter. In general the machine consists in known manner of a stationary casing 1, in front of which the so-called slide 2 can be shifted which is effected by the crank 3. The casing consists of the side-walls 4 and 5 and of a partition wall 6. These walls are covered with a plate 7 having a set of vertical slots 7' which are crossed by lines denoted by the numerals 0, 1, 2, . . . . 7, 8, 9, Lefthand therefrom a longitudinal slot 8 (Fig. 1) is provided in the top plate of the casing. The shaft 9 is supported in known manner in the wall 5 and provided with the driving crank 10. At the inner end of this shaft, within the casing, a cog-wheel 11 is secured thereto and meshes with a cog-wheel 12 affixed to a shaft 15 supported between the walls 5 and 6 and carrying the adjusting disks 14 which are firmly attached thereto. Each of these disks is provided with a lug 15 which projects through the slots 7' appertaining to the respective disk.

The slide 2 consists of two side-walls 26 and 27 and of a partition wall 28. Between these walls a shaft 29 is supported and carries the disks 30 for or of one of the indicating mechanisms, the disks being shoved upon said shaft. They are connected in known manner with cog-wheels 31 meshing with cog-wheels 33 carried by a shaft 32. The cog-wheels are located in the path of the adjustable teeth of the adjusting disks 14. Between the cog-wheels 33 are arranged tens-transmitting levers 35 carried by the shaft 34.

Below the shaft 32 is a shaft 36 which carries cog-wheels 37 which can also mesh with the adjustable teeth of the disks 14.

In the front part of the slide there is supported a shaft 38 between the walls 27 and 28, and the disks 39 of the second indicating mechanism are shoved upon, and carried by, this shaft. Also these disks are connected with cog-wheels 40. Behind the shaft 38 there is located a shaft 41 carrying cog-wheels 42 which mesh with the cog-wheels 40, and between the shafts 36 and 41 there is supported a shaft 43 carrying cog-wheels 44. The breadth of these cog-wheels is double that of the breadth of the cog-wheels 37 and 42. The cog-wheels 44 can mesh with the cog-wheels 37, as well as with the cog-wheels 42. Below the shafts 41 and 43 is arranged a shaft 45 carrying cog-wheels 46, the breadth of which is the same as that of the cog-wheels 44 and which are supported in such a way that they can mesh with the cog-wheels 42, as well as with the cog-wheels 44.

Bell-crank levers 48 are supported on a shaft 47 and so arranged that the free end of each lever lies in front of the tens-transmission levers 50 intended for the second indicating mechanism and supported on the shaft 49. The tens-pins 51 affixed to the disks 39 act on the bell-crank levers 48 and cause in this (known) way the transfer of the tens. The two shafts 43 which carry the cog-wheels 44 and 45 are shiftable and their ends project through the wall 5, as well as through the partition wall 6.

At the wall 5 is supported a shaft 52 provided with handle 53; it can be rotated, as well as shifted axially. A spring 54 located behind this shaft presses it forward. The shaft 52 is so arranged that it lies between the ends of the shafts 43 and 45. In the height of these shafts a member 55 is affixed to the shaft 52, and said member is provided with guide-ways 56 extending obliquely with respect to the axial direction of this shaft. These guide-ways extend parallelly to each other obliquely outwards and forwards, and terminate at notches provided in the shafts 43 and 45. When the handle 53 is turned to the left, the upper shaft 43 is shifted out of the casing, whereas the lower shaft 45 is pressed inwards. If the handle is turned in opposite direction, the upper shaft 43 is pressed inwards and the lower shaft 45 is drawn outwards. If the shaft 52 is shoved rearwards axially, both shafts are shoved outwards by the oblique guide-ways 56.

In order to check the shaft 52 in its several positions, an elastic pin 57 provided with a knob 58 is provided at the casing wall; the free end of this pin is wedge-shaped. On the shaft 52 a wedge-shaped member 59 is provided below said pin. According to the position of the handle 53 the wedge-shaped pin 57 contacts with one or the other side of the member 59. If the shaft is turned rearwards counter to the pressure of the spring 54, said pin gets to lie in front of the member 59 and prevents thereby rotation of said shaft in opposite direction. The checking can be released by the knob of the shaft 58, and when the pin 57 is lifted, the shaft 52 is turned back into its former position by the spring 54.

Between the walls 26 and 25 a shaft 60 is supported; this shaft carries the indicating disks 61 of the counting mechanism, and these disks carry cog-wheels 62 which mesh with the cog-wheels 64 which are located on the shaft 63 and are actuated by the tens-disks 22.

On the shaft 63 are supported the tens-transmission levers 66. The shaft 60 forms an extension of the shaft 29. Both said shafts project at both ends out of the casing and are provided with handle-forming winged members 67 and 68 by which resetting to zero is effected. At that side of the wall 28 which is directed towards the counting mechanism a tooth 69 is provided which is in connection with the shaft 29 and is moved when the handle 67 is turned in that direction in which the re-setting to zero is to be effected. In extensions of the shaft 38 a shaft 70 is supported between the walls 26 and 28, and indicating disks 71 are secured to this shaft. The shaft 70 projects forth from the wall 26 and is provided with a handle-forming member 72 by which the indicating disks 71, as well as the disks 39 of the second counting mechanism can be re-set to zero.

Behind the shaft 70 a shaft 73 (Fig. 7) is arranged which carries a cog-wheel 74 meshing with that cog-wheel which is connected with the unit-disk of the indicating mechanism 71, and in the height of the disks next following tens-teeth 75 are provided.

Over the shaft 70 a shaft 76 is located on which is arranged shiftably a cog-wheel 78 provided with a guide-sleeve 77. This cog-wheel meshes with the cog-wheel 74 and can get also into the path of the cog-wheel 69.

At the wall 28 an arm 80 is attached at the point 79 (Fig. 9); at the upper end of this arm a pin 81 is provided which extends into the guide-sleeve 77. Besides, a member 82 is attached revolubly to the arm 80, and guide-members 83 and 84 for the shiftable shafts 43 and 45 are attached to this member. When the shafts are shifted by a lateral re-adjustment of the handle 53, also the member 82 is re-adjusted, without, however, acting on the arm 80. If the shafts 43 and 45 are moved, however, in the same direction by longitudinal shifting of the shaft 52, the member 82 is not only rotated, but also shifted, and moves the arm 80 in the direction to the wall 28 whereby the cog-wheel 78 is shifted on its shaft.

In order to show which calculating possibilities the improved machine offers, the following example is given:

First a plurality of sub-totals shall be formed and then the final total thereof ascertained. There are provided at the slit 8 marks + (left) and — (right), and also below the adjustable handle 53 the marks or signs — (left) and + (right) are provided. In correspondence therewith the knob 20 is turned to the left, and the handle 53 is turned to the right.

As example the following calculation may be assumed:

$$\left.\begin{array}{l}39.15 = 585\\+45.8 = 360\\+52.12 = 624\end{array}\right\} = 1569.$$

The multiplication 39.15 is effected in known manner and the product 585 appears in the upper counting mechanism, as well as in the lower one. Now the upper counting mechanism is set to zero by means of the righthand handle 67. In the sub-total counting mechanism appears a 1. Now the second multiplication is effected, and in the upper counting mechanism appears the product 360, whereas in the lower one the sum of the two products, or sub-totals respectively, becomes visible, viz, the sum of 585+360. Now the upper counting mechanism is again re-set and the next multiplication is effected, i. e. 52.12. The product 624 appears in the upper counting mechanism and at the same time the final total of the three sub-totals 585+360+624=1569 appears in the lower counting mechanism. In the sub-total counting mechanism 71 three sub-totals are indicated after also the last sub-total in the upper counting mechanism has been effaced by re-setting the latter to zero.

By effacing the results in the first counting mechanism further results can be formed therein and read off it, and in the second counting mechanism the final sum, or final total respectively, is ascertained.

It may occur that a sub-total must be subtracted from the final total. To carry through a calculation of this kind nothing else is necessary than to re-adjust the handle 53 to the left (—).

Supposing, the sub-total of 43.13 is to be subtracted from the final total 1569. One forms again in the upper counting mechanism the product 559; in the lower counting mechanism this product is subtracted already while it is being formed in the upper one so that there appears in the upper counting mechanism the sub-total 559 and in the lower counting mechanism the result 1010.

In order to be able to ascertain from how many sub-totals the number in the second counting mechanism is composed, the sub-total counting mechanism 71 which is located at the side of the second indicating mechanism is provided. At every re-setting of the first counting mechanism to zero, the digit appearing in the mechanism 71 is increased by 1.

When performing comparatively long calculations of the kind stated, it may happen that during that time any simple calculation which is entirely independent of that just being carried through is to be made, that is to say, a calculation for which any simple calculating machine would do. Now, performing such a calculation is possible in the present improved machine without impairing the complicated other calculation just being effected. Nothing else is necessary to that purpose but to shift rearwards the shaft 52 whereby the second indicating mechanism is thrown out of gear. Now calculations can be effected without any influence upon the number adjusted in the second indicating mechanism, and re-settings to zero taking place in the first indicating mechanism 71 are not marked in the sub-total counting mechanism 71.

It is, therefore, possible to perform additions and multiplications in the upper counting mechanism, as well as in the lower one, but it is also possible to perform an addition or a multiplication in the upper counting mechanism, and at the same time a subtraction or a division in the lower one. Furthermore, it is possible to perform a subtraction or a division in the upper or in the lower counting mechanism. Finally, it is possible to perform a subtraction or a division in the upper mechanism and at the same time an addition or a multiplication in the lower one. Any of the two mechanisms may be thrown out of gear, the other remaining operative. Owing to all these possibilities all imaginable combinations of calculations can be performed by means of this improved machine, without separate intermediate calculations, as in other calculating machines.

In order to cause the appearance of the correct numbers in the counting mechanism also when negative calculations are being made, the direction of rotation of the digit-disks 61 of the respective counting mechanism is reversed by turning the adjusting mechanism counter to the normal direction. This is effected merely by shifting the handle 20 from the left to the right.

In Figures 5, 6 and 7 is shown how the motion of the second indicating mechanism can be reversed and how it can be thrown entirely out of action.

The cog-wheels 37 and 42 are arranged in different planes, there being between the appertaining wheels gaps amounting each to the thickness of one such wheel. It has already been mentioned that the thickness of the cog-wheels 44 and 46 is double that of the wheels 37 and 42. When the handle 56 is readjusted to the right, also the wheels 46 are shifted to the right, whereas the wheels 44 are shifted to the left (Fig. 5). The position of the wheels 44 is then such that they are located in the plane of the wheels 37, as well as in the plane of the wheels 42, whereas the wheels 46 are meshing for about one half with the wheels 44, but are out of the path of the wheels 42. When the adjusting mechanism is turned, the visible digit is transmitted over and by the cog-wheels 37, 44 and 42 to the cog-wheel 40 which is connected with the number-disk 39, this latter being now turned in that direction in which the first adjusting mechanism has been turned.

If the handle 56 is shifted to the left, the shaft 43 is shifted to the right and the shaft 45 to the left (Fig. 6). The cog-wheels 44 get out of the path of the cog-wheels 42, but remain meshing with the cog-wheels 37 and 46. The transfer from the adjusting gear takes place now by and over the cog-wheels 37, 44, 46 and 42 to the cog-wheel 40 which is connected with the digit-disk 39. The train of wheels is now greater by one, so that the direction of rotation of the digit-disks is the reverse of the former rotation.

When the shaft 52 is pressed rearwards, the oblique guides 56 shift outwards the shaft 43, as well as the shaft 45. The cog-wheel 44 and the cog-wheel 46 get out of the path of the cog wheel 42, and the connection of the cog-wheel 37 (which is under the influence of the adjusting mechanism) with the cog-wheel 42 (Fig. 7) is interrupted.

By the shifting of the two shafts outwards also the arm 80 has been moved in such a way as to shift laterally the cog-wheel 78 and to move it out of the path of the tooth 69 so that when the member by which re-setting to zero is effected the sub-total counting mechanism 71 cannot be actuated. As the intermediate wheel 74 is broader than the cog-wheel 78 and than that cog-wheel which is connected with the indicating disk, these cog-wheels remain in gear with each other.

If the knob 58 is lifted the shaft 52 is thrown forward by the spring 54 so that again adjustment to the right or to the left, as already described, can be effected. The lever 80 is moved back into its former position and moves the cog-wheel 78 into the path of the tooth 69 so that now every zero-position is again registered in the sub-total counting mechanism.

It is obvious that the arrangement and combination of parts characterizing the invention can be combined also with suitable other calculating machines, for instance the Thomas machines.

I claim:

1. A calculating machine, comprising, in combination, two counting mechanisms, of which either is adapted to operate independent from the other; an adjusting mechanism common for both said counting mechanisms; a reversing gear forming an intermediary motion-transmitting means between one of the counting-mechanisms and said adjusting mechanism; a rotary guide-member forming the means, by the rotation of which said reversing gear is reversed, the arrangement being such that the shafts of the cog-wheels located between the cog-wheels driven by the said adjusting mechanism and the cog-wheels meshing with the wheels of the counting-mechanisms are adapted to be shifted in opposite directions, substantially and for the purpose as described.

2. A calculating machine, comprising, in combination, two counting mechanisms, of which either is adapted to operate independent of the other; an adjusting mechanism common to both said counting mechanisms; a reversing gear forming the means for transmitting motion from said adjusting mechanism to one of the counting mechanisms; a rotary, as well as axially shiftable guide-member forming the means, by the rotation of which said reversing gear is reversed, the arrangement being such that by the rotation of said guide-member the shafts of the cog-wheels located between the cog-wheels driven by the said adjusting mechanism and the cog-wheels meshing with the wheels of the counting mechanisms are adapted to be shifted in opposite directions, and that by the shifting of the said guide-member the shafts mentioned are shifted equal distances, substantially and for the purpose as described.

3. A calculating machine, comprising, in combination, two counting mechanisms, of which either is adapted to operate independent of the other; an adjusting mechanism common to both said counting mechanisms; a reversing gear forming an intermediary motion-transmitting means between one of the counting mechanisms and said adjusting mechanism; a rotary, as well as axially shiftable guide-member forming the means, by the rotation of which said reversing gear is reversed, and being provided with oblique guide-ways; a lug provided on the shaft carrying said guide-member, and an elastic wedge-shaped member adapted to check said lug, the arrangement being such that by the rotation of said guide-member the shafts of the cog-wheels located between the cog-wheels driven by the said adjusting mechanism and the cog-wheels meshing with the wheels of the counting mechanism are adapted to be shifted in opposite directions, and that by the shifting of the said guide-member the shafts mentioned are shifted equal distances, the said wedge-shaped member then getting in front of the said lug so as to check it, substantially and for the purpose set forth.

In testimony whereof I affix my signature.

ERNST SCHUSTER.